Patented July 11, 1933

1,917,688

UNITED STATES PATENT OFFICE

KENNETH M. BAUM, OF CLARKDALE, ARIZONA, ASSIGNOR TO UNITED VERDE COPPER COMPANY, OF CLARKDALE, ARIZONA, A CORPORATION OF DELAWARE

RECOVERY OF SULPHUR

No Drawing. Application filed September 25, 1929. Serial No. 395,179.

This invention relates to the recovery of sulphur and has for an object the provision of an improved process for recovering elemental sulphur from substances containing combined sulphur. More particularly, the invention contemplates the provision of an improved process for recovering sulphur from gaseous sulphur compounds. The invention further contemplates the provision of an improved catalyst for promoting chemical reactions.

I have discovered that chemical reactions may be accelerated appreciably when conducted in the presence of certain adsorbent materials one of which is the better adsorbent for one of the reagents and another of which is the better adsorbent for another of the reagents. Thus, for example, I have discovered that in carrying out a reaction between sulphur dioxide and hydrogen sulphide for the production of elemental sulphur, the reaction is accelerated if carried out in the presence of a mixture of activated carbon which adsorbs hydrogen sulphide more readily than it adsorbs sulphur dioxide and a mineral gel such, for example, as an artificial zeolite or silica gel which adsorbs sulphur dioxide more readily than it adsorbs hydrogen sulphide.

In preparing catalysts in accordance with the present invention, it is advisable to form an intimate mixture of the components. The production of intimate mixtures will be facilitated if one of the initial components is a normally solid porous substance and another is a fluid which may enter the pores of the solid. If one of the components is liable to be consumed or destroyed by one or more of the reagents or by another substance contained in the reaction mixture, it is advisable to so form the mixture that that component is impregnated and/or coated with the other component. For example, while activated carbon alone promotes a reaction between hydrogen sulphide and sulphur dioxide, it will be consumed during the process in the event that free oxygen is present in the reaction mixture. However, if finely divided activated carbon is mixed with one of the components of an artificial zeolite or silica gel before the mixing of the components takes place, or if the carbon is mixed with the artificial zeolite mixture or the silica gel mixture before the gel forms, the gel will be formed or deposited on the surfaces and in the pores of the carbon particles, and the coated or impregnated carbon particles may be utilized in promoting a reaction between hydrogen sulphide and sulphur dioxide whether or not free oxygen is present in the reaction mixture and without the carbon being consumed or destroyed when free oxygen is present.

In preparing catalytic agents in accordance with my invention, I prefer to use carbon which has been produced and activated by distilling wood, coal or lignite at a low temperature, preferably below 600° C., until substantially all of the volatile matter has been removed and treating the charcoal thus formed with live steam or air.

In preparing a mixture of activated carbon and a mineral gel, I may first mix finely divided carbon with a solution of one of the components of the gel and then add the other component and permit the mixture to gel. After the gel has formed, the composite agent is washed and dried at a low temperature, and, when dry, it is granulated to provide particles of the desired sizes.

In order to insure the presence of gel in the pores of the carbon particles, it is sometimes desirable to first mix the components of the gel to form a mixture of such fluidity that it may easily enter the pores of the carbon particles and then incorporate the carbon in the mixture before the gel forms. It is also desirable to form the composite agents under reduced pressures in order to remove air and other gases from the pores of the carbon particles and permit the gel components to enter readily.

Mixtures of carbon and mineral gels may also be formed in accordance with the present invention by mixing finely divided carbon and gels and compressing and subsequently granulating the resulting mixtures. Carbon may be deposited as a reaction product in the pores of a mineral gel to produce a composite catalyst.

When the composite agent is formed by mixing carbon particles with a fluid component of a gel or with a mixture of the gel components before the gel forms, the particle size of the granulated composite catalytic agent will depend largely upon the particle size of the activated carbon used. In such cases, particle size of the activated carbon should be such that a bed of the composite agent will permit fluid penetration. I have found that carbon particles ranging in size between 10 and 20 mesh may be used advantageously.

Carbon may be used in any desired proportions, but, in order to obtain the best results, sufficient gel should be present to thoroughly coat and/or impregnate the carbon particles. I have found that composite agents containing about two parts by weight of carbon and one part by weight of gel are highly satisfactory.

In utilizing a composite catalytic agent of my invention, for example, in the production of elemental sulphur from hydrogen sulphide and sulphur dioxide, the hydrogen sulphide and sulphur dioxide may be obtained from any desired sources. In view of the fact that the carbon contained in the composite reagent will not be consumed appreciably in the event that free oxygen is present, it is not essential that oxygen-free gases be used. Sulphur dioxide gases produced during the smelting of sulphide ores, and hydrogen sulphide which may be obtained from the interaction of acids with mattes obtained during the same operations provide suitable raw materials.

The granulated composite catalyst is formed into porous beds in suitably enclosed chamber and a mixture of the two gases is passed through such beds, preferably through two such beds in series. The reaction is initiated at atmospheric temperatures and proceeds according to the following equation:

$$2H_2S + SO_2 = 2H_2O + 3S$$

Sufficient heat is developed to vaporize all water formed. The elemental sulphur is deposited on the catalyst and the activity of the catalyst is gradually impaired. When the activity of the catalyst has been impaired to such an extent that the speed of the reaction is uneconomical, the sulphur laden bed is cut out of series and a fresh bed is inserted.

The elemental sulphur may be removed from the catalyst by means of live steam or superheated water, or by means of a suitable solvent for sulphur.

I claim:—

1. The method of recovering sulphur which comprises subjecting hydrogen sulfide to the action of sulphur dioxide in the presence of a mixture of activated carbon and a mineral gel.

2. The method of recovering sulphur which comprises subjecting hydrogen sulphide to the action of sulphur dioxide in the presence of particles of activated carbon impregnated with a mineral gel.

3. The method of recovering sulphur which comprises subjecting hydrogen sulphide to the action of sulphur dioxide in the presence of a mixture of activated carbon and an artificial zeolite.

4. The method of recovering sulphur which comprises subjecting hydrogen sulphide to the action of sulphur dioxide in the presence of particles of activated carbon impregnated with an artificial zeolite.

5. An agent for promoting a reaction between hydrogen sulphide and sulphur dioxide comprising a mixture of activated carbon and an artificial zeolite.

6. An agent for promoting a reaction between hydrogen sulphide and sulphur dioxide comprising particles of activated carbon impregnated with an artificial zeolite.

7. The method of recovering sulphur which comprises subjecting sulphur dioxide to the action of a reducing agent in the presence of a mixture of activated carbon and a mineral gel.

8. The method of recovering sulphur which comprises subjecting hydrogen sulphide to the action of an oxidizing agent in the presence of a mixture of activated carbon and a mineral gel.

9. The method of recovering sulphur which comprises subjecting hydrogen sulphide to the action of sulphur dioxide in the presence of a mixture of adsorbent materials one of which is the better adsorbent for hydrogen sulphide and another of which is the better adsorbent for sulphur dioxide.

10. The method of recovering sulphur which comprises subjecting sulphur dioxide to the action of a reducing agent in the presence of a mixture of adsorbent materials one of which is a zeolite.

11. The method of recovering sulphur which comprises subjecting hydrogen sulphide to the action of an oxidizing agent in the presence of a mixture of adsorbent materials one of which is a zeolite.

12. The method of recovering sulphur which comprises subjecting sulphur dioxide to the action of a reducing agent in the presence of a mixture of adsorbent materials one of which is activated carbon.

13. The method of recovering sulphur which comprises subjecting hydrogen sulphide to the action of an oxidizing agent in the presence of a mixture of adsorbent materials one of which is activated carbon.

In testimony whereof I affix my signature.

KENNETH M. BAUM.